July 17, 1934.  W. R. GROGAN ET AL  1,967,007
LOCKING DEVICE
Filed March 22, 1933  2 Sheets-Sheet 2
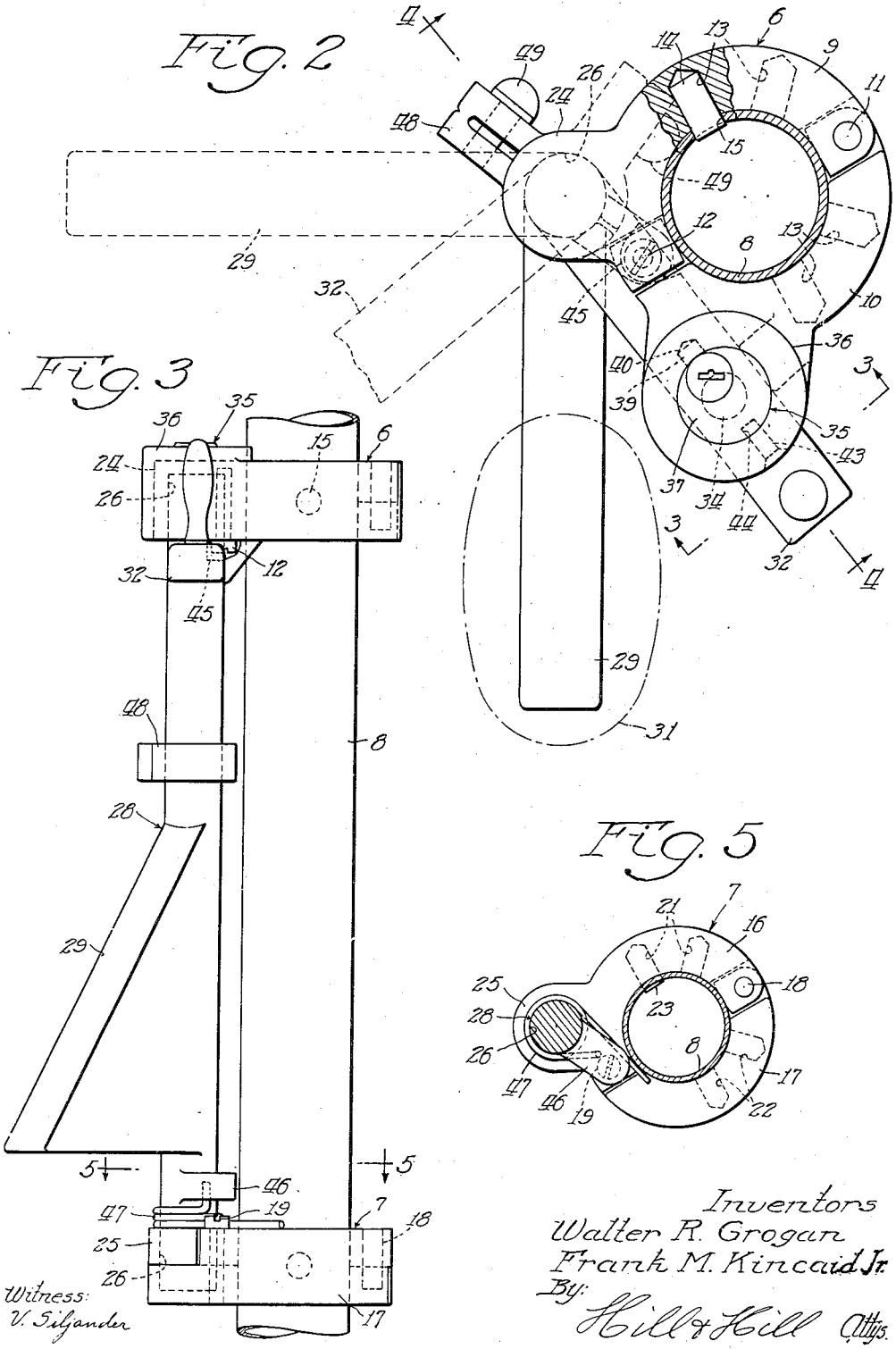
Inventors
Walter R. Grogan
Frank M. Kincaid Jr.
By Hill & Hill Attys.
Witness
V. Siljander Patented July 17, 1934

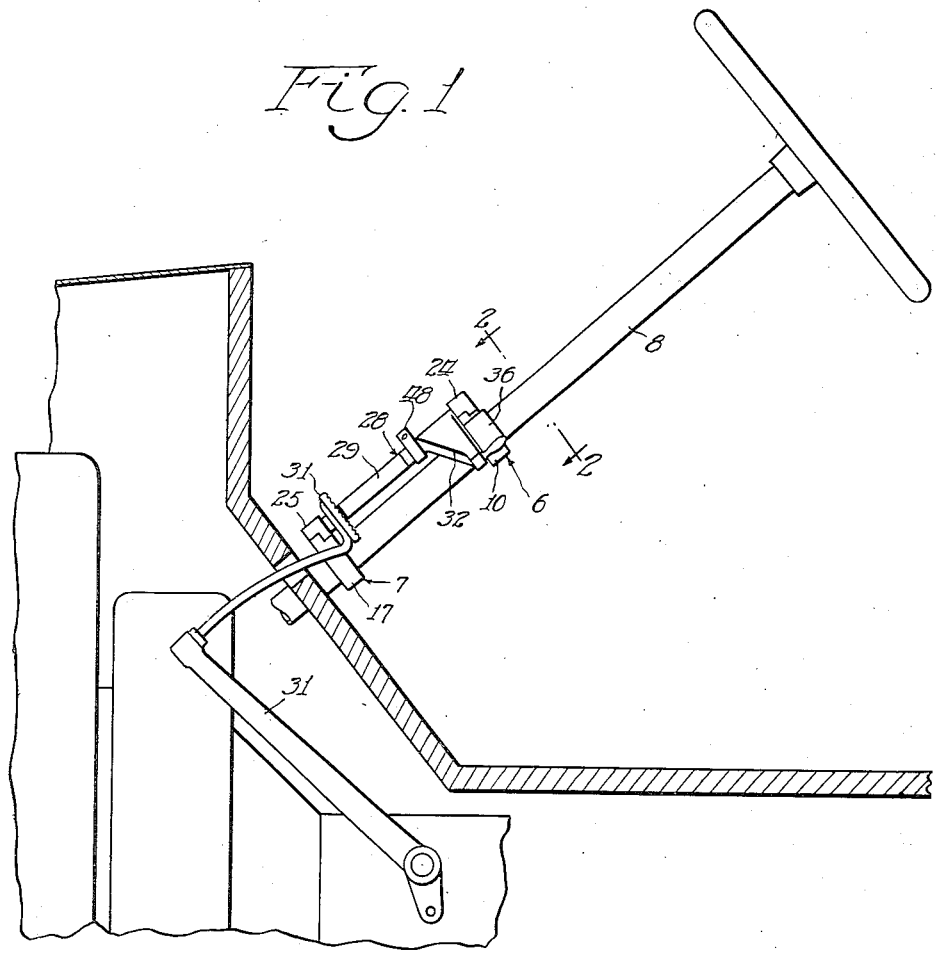
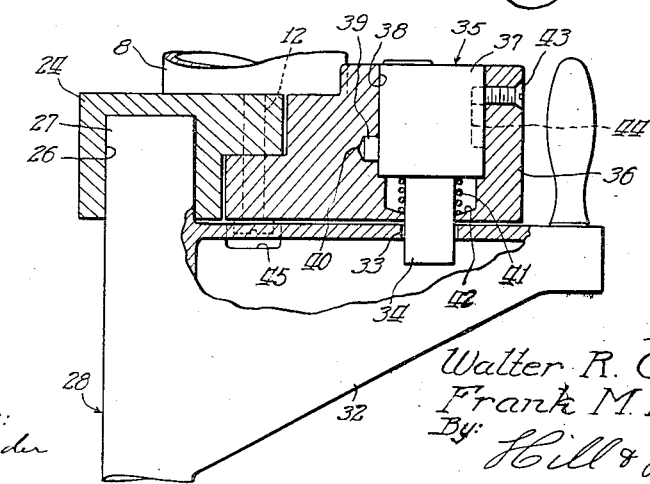

1,967,007

UNITED STATES PATENT OFFICE 1,967,007

LOCKING DEVICE

Walter R. Grogan and Frank M. Kincaid, Jr., Chicago, Ill.

Application March 22, 1933, Serial No. 662,070

13 Claims. (Cl. 70—128)

This invention relates to a locking device, and more specifically to a device of the character described which is particularly well adapted for use in connection with motor vehicles to prevent the unauthorized operation thereof.

One object of the present invention is to provide a locking device which may be conveniently mounted on a suitable support, and which may be readily manipulated to engage and retain, in inoperative position, an element essential to the operation of the vehicle or other mechanism.

Another object of the invention is to provide a locking device wherein the fastening means employed for securing the device to its support are protected against removal when the device is in locking position.

A further object of the invention is to provide a locking device wherein the element retaining means is automatically moved to inoperative position when the lock mechanism is released or removed from locking position.

A still further object of the invention is to improve devices of the character described in sundry details hereinafter referred to and particularly pointed out in the appended claims.

One embodiment of the present invention is shown for illustrative purposes in the accompanying drawings, in which Fig. 1 is a side elevational view of our improved locking device illustrating its application to certain of the control elements employed in the operation of a motor vehicle;

Fig. 2 is an enlarged plan sectional view of the structure illustrated in Fig. 1 and taken substantially as indicated by the line 2—2 thereof;

Fig. 3 is an enlarged elevational view of our improved locking device taken in the direction indicated by the arrows 3—3 of Fig. 2;

Fig. 4 is a fragmentary sectional elevation taken substantially as indicated by the line 4—4 of Fig. 2; and Fig. 5 is a plan section taken substantially as indicated by the line 5—5 of Fig. 3.

The illustrative embodiment of the present invention comprises a pair of brackets indicated as a whole by the numerals 6 and 7 adapted to be rigidly secured to a suitable support shown, in the present instance, as the steering column 8 of a motor vehicle or the like.

The bracket 6 comprises a pair of substantially semi-circular portions 9 and 10 pivotally connected at one of their adjacent end portions by a pin 11 and adapted to surround the support or steering column 8. The opposite ends of the portions 9 and 10 are offset or reduced in width and adapted to overlap each other and to be secured together by suitable fastening means shown, in the present instance, as a screw bolt 12.

For securing the bracket 6 against annular and longitudinal movement with respect to the steering column 8, each of the portions 9 and 10 are provided with a plurality of recesses 13, any one of which is adapted to receive a dowel pin 14 arranged to extend into an opening 15 formed in the steering column 8 at a point suitable to the mounting of the locking device in operative relationship to a control element employed in the operation of the vehicle.

The bracket 7 is constructed similar to the bracket 6, and comprises semi-circular portions 16 and 17 pivotally connected at one of their adjacent ends by means of a pin 18 and adapted to surround the steering column 8, the opposite ends of the portions 16 and 17 being secured together by suitable means shown, in the present instance, as a screw bolt 19. The portions 16 and 17 are also provided with recesses 21 and 22 adapted to receive a pin 23 for securing the bracket to the steering column in the manner illustrated and described with reference to the pin 14 of the bracket 6.

Formed on the brackets 6 and 7 are laterally extending bosses or ears 24 and 25, respectively, the said ears having recesses 26 formed therein adapted to receive trunnions 27 formed on a retaining member indicated as a whole by the numeral 28 in a manner to rotatably support the retaining member in and between the brackets 6 and 7.

The retaining member 28, in the present instance, is provided with a laterally extending pedal engaging and retaining portion 29 adapted to engage a control element shown, in the present instance, as the clutch or pedal or lever 31 of a motor vehicle when the retaining member 28 and portion 29 are in the position illustrated in Figs. 1, 2, and 3, in a manner to retain the clutch pedal or lever 31 depressed and the cooperating clutch elements (not shown) disengaged.

For securing the portion 29 in pedal-engaging position, the retaining member 28 is provided preferably adjacent its upper end and adjacent the bracket 6 with a laterally extending arm 32 having an aperture 33 formed therein adapted to receive a stud 34 of a lock mechanism indicated as a whole by the numeral 35 mounted in and operatively related to a projection 36 carried by the portion 10 of the bracket 6, the lock mechanism shown, in the present instance, being of the tumbler type and having a housing 37 slidably movable in an opening 38 formed in the projection 36 and having a laterally movable key-operated lock bolt 39 adapted to engage a recess 40 when the stud 34 is in engagement with the aperture 33 of the arm 32.

For automatically moving the stud 34 out of engagement with the aperture 33 of the arm 32 when the lock bolt 39 is withdrawn from the recess 40, a compression spring 41 is positioned between one end of the housing 37 and a shoulder 42 formed in the projection 36, and for retaining the housing 37 within the opening 38 while permitting movement of the housing therein, a screw-pin 43 is rigidly mounted in the projection 36 in a manner to engage a longitudinally extending groove 44 formed in the periphery of the housing 37 of the lock mechanism.

For protecting the bolt 12 of the bracket 6 against removal when the locking device is in operative or locking position, the arm 32 is provided with a recess or cut-away portion 45 adjacent one of its sides adapted to receive the head of the bolt 12 in a manner to permit the arm 32 to overlie the bolt and prevent the removal thereof.

For protecting the bolt 19 of the bracket 7 against removal when the locking device is in locking or operative position, the retaining member 28 is provided adjacent its lower end with a lug 46 adapted to overlie the head of the bolt 19 as clearly illustrated in Figs. 3 and 5, in a manner to prevent withdrawal of the bolt from its securing position in the ends of the portions 16 and 17 of the bracket 7.

For automatically moving the retaining member 28 and pedal engaging portion 29 to inoperative or unlocked position when the stud 34 of the lock mechanism 35 is released or removed from engagement with the arm 32, resilient means shown, in the present instance, as a coil spring 47 is positioned around the lower end of the retaining member and has one of its ends operatively connected with the lug 46, and its opposite end contacting the side of the steering column 8. It will be observed from the foregoing description that when the arm 32 is released from its locking position, the retaining member 28 will be rotated in its bearing bracket supports under the influence of the spring 47 to its inoperative or unlocked position shown by dotted lines in Fig. 2, and for limiting the movement of the retaining member to its inoperative position, or as might be desired, a stop arm 48 is adjustably mounted on the retaining member 28 and provided preferably with a resilient pad 49 formed of suitable material such as rubber, felt or the like adapted to engage the steering column 8 as illustrated in dotted lines in Fig. 2, where it may be yieldingly maintained under tension of the spring 47.

It will be observed from the foregoing description that when it is desired to lock or secure the vehicle against unauthorized operation, the clutch pedal 31 may be depressed to disengage the clutch elements and the retaining member 28 swung about its pivot from the dotted line position of Fig. 2 to the full line position shown in the various figures, and in a manner to position the pedal engaging portion 29 of the retaining member 28 above or in engagement with the depressed pedal 31 as clearly illustrated in Fig. 1, thereby preventing the return of the pedal to normal or clutch engaging position, and by securing the arm 32 to the bracket 6 by suitable lock mechanism, as for example, by means of the stud 34, the portion 29 of the retaining member 28 will be secured in pedal engaging position, and by reason of the arm 32 and lug 46 covering or overlying the bolts 12 and 19, respectively, the device is completely protected against unauthorized manipulation or removal.

Obviously, the present invention is not limited to the precise construction and arrangement shown and described, as the same may be variously modified. Moreover, all the features of the invention need not be used conjointly, as the same may be used to advantage in variously different combinations and sub-combinations.

What we claim as new and desire to secure by Letters Patent is:

1. In a device of the class described, the combination of a plurality of bearing brackets, a retaining member rotatably mounted in said brackets, and an arm mounted on said member adjacent one of said brackets and adapted to be releasably secured thereto.

2. In a device of the class described, the combination of a plurality of bearing brackets, a retaining member pivotally mounted in said brackets, and an arm mounted on said member adjacent one of said brackets and adapted to be engaged by a lock mechanism operatively related to said last mentioned bracket for releasably securing said arm and retaining member against movement with respect to said brackets.

3. In a device of the class described, the combination with a support, of a plurality of bearing brackets mounted thereon, a retaining member pivotally mounted in said brackets on an axis substantially parallel to said support, and an arm mounted on said member adjacent one of said brackets and adapted to be engaged by a lock mechanism operatively related to said last mentioned bracket for releasably securing said arm and retaining member against movement with respect to said brackets and said support.

4. In a device of the class described, the combination with a support, of a plurality of bearing brackets mounted thereon in spaced relation with respect to each other, a retaining member between said brackets and having trunnions rotatably mounted in said brackets, and an arm mounted on said member adjacent one of said brackets and adapted to be engaged by a lock mechanism operatively related to said last mentioned bracket for releasably securing said arm and retaining member against movement with respect to said brackets and said support.

5. In a device of the class described, the combination with a support, of a plurality of spaced bearing brackets mounted thereon, a retaining member pivotally mounted in and between said brackets, an arm mounted on said member adjacent one of said brackets and adapted to be engaged by a lock mechanism operatively related to said last mentioned bracket for releasably securing said arm and retaining member in operative position, and means for automatically moving said arm and retaining member to inoperative position when said arm is released from said lock mechanism.

6. In a locking device of the class described, the combination with a support, of a plurality of spaced bearing brackets mounted thereon, a retaining member pivotally mounted in and between said brackets, an arm mounted on said member adjacent one of said brackets and adapted to be engaged by a lock mechanism operatively related to said last mentioned bracket for releasably securing said arm and retaining member against movement with respect to said brackets and in an operative locking position, resilient means operatively related to said member for moving said arm and retaining member to inoperative position when said arm is released from said lock mechanism, and means on said retaining member for limiting the movement thereof to inoperative position.

7. In a locking device of the class described, the combination with a support, of a plurality of spaced bearing brackets rigidly secured to said support, a retaining member having trunnions adjacent its opposite ends pivotally mounted in said brackets, an arm mounted rigidly on said member adjacent one of said brackets and having an aperture formed thereon adapted to receive the lock-stud of a lock mechanism operatively related to said last mentioned bracket for releasably securing said arm and retaining means against movement with respect to said brackets and in an operative locking position, and resilient means operatively related to said member and support for moving and yieldingly maintaining said arm and retaining member in inoperative position when said locking stud is removed from said aperture.

8. In a device of the class described, the combination with a support, of a plurality of spaced brackets, each comprising a pair of pivotally connected portions adapted to surround said support in fixed relation thereto, removable securing means for connecting the free ends of said portions, a retaining member pivotally mounted in and between said brackets, an arm mounted on said member adjacent one of said brackets and adapted to be engaged by lock mechanism operatively related to said last mentioned bracket for releasably securing said arm and retaining member against movement with respect to said brackets and support, said arm being arranged to overlie the removable securing means of said last mentioned bracket to prevent removal thereof, and a lug mounted on said retaining member and adapted to overlie the securing means of the other of said brackets for preventing the removal thereof.

9. In a device of the class described, the combination with the steering column of a motor vehicle, of a plurality of spaced brackets, each comprising a pair of pivotally connected portions adapted to surround said column in fixed relation thereto, removable screw bolts for connecting the free ends of said portions, a retaining member pivotally mounted in and between said brackets and adapted to engage a control lever of said motor vehicle to prevent effective operation of the lever, an arm mounted on said member adjacent one of said brackets and adapted to be engaged by lock mechanism operatively related to said last mentioned bracket for releasably securing said arm against movement with respect to said bracket and column and for maintaining said retaining member in engagement with said lever, said arm being arranged to overlie the removable screw bolt of said last mentioned bracket to prevent removal thereof when the arm is operatively engaged by said lock mechanism, and a lug mounted on said retaining member and adapted to overlie the screw bolt of the other of said brackets for preventing the removal thereof when the retaining member is in engagement with said control lever.

10. In a device of the class described, the combination with the steering column of a motor vehicle, of a plurality of spaced brackets, each comprising a pair of pivotally connected portions adapted to surround said column in fixed relation thereto, removable securing means for connecting the free ends of said portions, a retaining member pivotally mounted in and between said brackets and adapted to engage a control lever of said motor vehicle, an arm mounted on said retaining member adjacent one of said brackets and adapted to be engaged by lock mechanism operatively related to said last mentioned bracket for securing said arm against movement with respect to said brackets and column and for maintaining said retaining member in engagement with said lever, said arm being arranged to overlie the removable securing means of said last mentioned bracket to prevent removal thereof, a lug mounted on said retaining member and adapted to overlie the securing means of the other of said brackets for preventing removal thereof, and resilient means for removing said retaining means from engagement with said lever when said arm is released from said lock mechanism.

11. In a device of the class described, the combination with the steering column of a motor vehicle, of a bearing bracket mounted thereon and comprising a pair of pivotally connected portions adapted to surround said column in fixed relation thereto and secured together adjacent their free ends, a projection having a lock mechanism mounted therein carried by one of said bracket portions, a second bracket mounted rigidly on said column in spaced relation with respect to said first mentioned bracket, a retaining member pivotally mounted in and between said brackets and adapted to engage a control lever of said motor vehicle to prevent effective operation thereof, an arm mounted on said retaining member adjacent said first mentioned bracket and having an aperture formed in said arm adapted to receive a stud forming a part of said lock mechanism for releasably securing said arm against movement with respect to said first mentioned bracket and column and for maintaining said retaining member in engagement with said control lever, resilient means operatively related to said retaining member for moving the member out of engagement with said lever when the stud of said lock mechanism is removed from said aperture and for yieldingly maintaining the retaining member in inoperative position out of engagement with said lever, and an adjustable stop member mounted on the retaining member for limiting the movement thereof under the influence of said resilient means.

12. In a locking device of the class described, the combination with a support, of a plurality of spaced bearing brackets mounted thereon, a retaining member pivotally mounted in and between said brackets and adapted to engage a movable element to prevent effective operation thereof, an arm mounted on said member adjacent one of said brackets and adapted to be engaged by a lock mechanism operatively related to said last mentioned bracket for releasably securing said arm against movement with respect to said bracket and for securing said retaining member in operative locking position with respect to said element, resilient means operatively related to said member for moving said arm and retaining member to unsecured and inoperative positions, respectively, when said arm is released from said lock mechanism, and means on said retaining member and cooperable with said support for limiting the movement of the retaining member to its inoperative position.

13. In a device of the class described, the combination with the steering column of a motor vehicle, of a plurality of spaced brackets rigidly secured to said column, a retaining member pivotally mounted with respect to said steering column and between said brackets, and an arm mounted on said member adjacent one of said brackets and adapted to be engaged by a lock mechanism operatively related to said last mentioned bracket for securing said arm and retaining member against movement with respect to said brackets and column.

WALTER R. GROGAN.
FRANK M. KINCAID, Jr.